United States Patent [19]

Schirmer

[11] Patent Number: 4,608,302

[45] Date of Patent: Aug. 26, 1986

[54] ORIENTED FILMS FROM PROPYLENE COPOLYMERS AND UNPLASTICIZED SARAN

[75] Inventor: Henry G. Schirmer, Spartanburg, S.C.

[73] Assignee: W. R. Grace & Co., Cryovac Div., Duncan, S.C.

[21] Appl. No.: 696,287

[22] Filed: Jan. 30, 1985

[51] Int. Cl.⁴ .................. B65B 25/22; B32B 27/08; B65D 81/34

[52] U.S. Cl. ........................ 428/349; 428/913; 428/910; 428/216; 428/516; 428/520; 426/127; 426/412; 264/176 R; 264/209.5

[58] Field of Search .............. 428/349, 516, 520, 910; 426/127, 412

[56] References Cited

U.S. PATENT DOCUMENTS

| | | |
|---|---|---|
| 3,524,795 | 8/1970 | Peterson ........................ 156/244 |
| 3,558,330 | 1/1971 | Widiger et al. ................. 99/174 |
| 3,634,553 | 1/1972 | Foglia et al. ................... 260/897 A |
| 3,754,063 | 8/1973 | Schirmer ........................ 264/22 |
| 3,808,304 | 4/1974 | Schirmer ........................ 264/289 |
| 3,850,790 | 11/1974 | Denervaud .................... 156/244 |
| 3,891,008 | 6/1975 | D'Entremont ................. 138/146 |
| 4,207,363 | 6/1980 | Lustig et al. ................... 428/35 |
| 4,424,243 | 1/1984 | Nishimoto et al. ............ 428/36 |
| 4,448,792 | 5/1984 | Schirmer ........................ 426/113 |

*Primary Examiner*—P. C. Ives
*Attorney, Agent, or Firm*—John J. Toney; William D. Lee, Jr.; Mark B. Quatt

[57] ABSTRACT

A heat-shrinkable thermoplastic film includes a food contact layer; a second layer of propylene homopolymer or copolymer, ethylene copolymer, butylene homopolymer or blends thereof; an adhesive layer; a layer of unplasticized vinylidene chloride copolymer; another adhesive layer; and an optical clarity layer.

7 Claims, 2 Drawing Figures

ORIENTED FILMS FROM PROPYLENE COPOLYMERS AND UNPLASTICIZED SARAN

BACKGROUND OF THE INVENTION

This invention relates generally to heat shrinkable, relatively gas and moisture impermeable, thermoplastic packaging films which can be heat sealed to itself to form a flexible package. The invention relates more particularly to packaging films for food products such as bakery goods, snack foods, cheese products, and candy where a high moisture vapor barrier and oxygen barrier packaging material is required.

There is a need in the food packaging industry for a packaging film which has improved moisture vapor and oxygen barrier characteristics. A packaging film for use in connection with food products should exhibit several desirable characteristics. The film should be heat shrinkable so as to provide an attractively packaged food product. Additionally, the film should be heat sealable and have seal integrity under processing conditions, and in particular the heat sealed seams should resist being pulled apart during heat shrinking operations. The film should also be heat sealable to itself. Furthermore, the food contact layer of such a film must qualify under the appropriate food laws and regulations for safe food contact. Very importantly, the film must provide a good oxygen and vapor barrier, i.e. must possess a low permeability to both oxygen and water vapor to maintain the freshness of the food contained therein. Also, the film must possess sufficient shrink energy such that upon the heat shrinking of a food product in a package made from the film in accordance with the invention, the film will shrink snuggly around the product contained therein, representatively about 30 to 50% biaxial shrinkage at about 90° C. In addition to the foregoing, the film should desirably possess optical clarity i.e. the film should not become cloudy upon exposure to conditions of heat shrink, so that the consumer appeal of the packaged product is maintained.

In general, such a multi-layer film structure will have the minimal structure (sealing and food contact layer/shrink layer/barrier layer/sealing and food contact layer), a composite structure being required to achieve the desired composite properties of the packaging film. A preferred barrier material is unplasticized saran which refers to a family of thermoplastic resins, such as vinylidene chloride polymers, and copolymers of vinylidene chloride with other monomers such as vinyl chloride, acrylonitrile, methyl methacrylate, acrylates, acrylate esthers, and vinyl acetate. Copolymers of vinylidene chloride with other monomers are generally described in terms of the weight ratio of the monomer units in the copolymer. Saran by definition, has at least 50% vinylidene chloride. The unplasticized saran of the present invention is a low viscosity saran.

A heat shrinkable, thermoplastic, multi-layer packaging film which has enjoyed considerable commercial success for making bags having low gas transmission is described in U.S. Pat. No. 3,741,253 issued on June 26, 1973 to Brax et al, which relates to a multi-layer film comprising a first outside layer of an irradiated ethylene vinyl acetate copolymer, a core layer of polyvinylidene chloride copolymer, and a second outside layer of an ethylene vinyl acetate copolymer. Typically the process of manufacturing this type of oriented heat shrinkable film is a tubular orientation process wherein a primary tube of the film is biaxially oriented by stretching with internal pressure in the transverse direction and the use of pinch rolls at different speeds in the machine direction. This "blown bubble" technique is well known in the art. After the bubble is collapsed, the film is wound up as flattened, seamless, tubular film to be used later to make bags, for example either end seal bags typically made by transversely heat sealing across the width of flattened tubing followed by severing the tubing so that the transverse seal forms the bottom of a bag, or side-sealed bags in which the transverse seals from the bag sides and one edge of the tubing form the bag bottom.

This type of bag is used by placing the food product in the bag, evacuating the bag, gathering and applying a metal clip around the gathered mouth of the bag to form a hermetic seal, and then immersing the bag in a hot water bath at approximately the same temperature at which the film was stretch-oriented, typically about 160° to 205° F., hot water immersion being one of the quickest and most economical means of transferring sufficient heat to the film to shrink it uniformly. One problem which has been encountered is the failure of the bag seals at the bottom of the bags as the bag is shrunk around a product, the shrink forces tending to pull the seal apart.

Of interest concerning the present invention, is the disclosure of U.S. Pat. No. 3,808,304 for "Oriented Blends of Polypropylene and Poly-Butene-1" issued Apr. 30, 1974 to Schirmer, being directed to packaging film made of such blends and having improved heat sealing and heat shrinking properties in near boiling water.

Of interest is the disclosure of U.S. Pat. No. 3,634,553 for "Heat Shrinkable Films of Polypropylene and an Ethylene/Butene Copolymer" issued Jan. 11, 1972 to Foglia et al, being directed to oriented thermoplastic films formed from blends of a high isotactic content polypropylene with an ethylene/butene-1 copolymer containing a minor amount of ethylene.

Of interest is the disclosure of U.S. Pat. No. 4,207,363 for "Flexible Heat Shrinkable Multilayer Film For Packaging Primal Meat" issued June 10, 1980 to Lustig et al, being directed to a heat shrinkable multi-layer film including a first outer layer comprising a blend of a propylene-ethylene copolymer, a butene-1/ethylene copolymer, and a thermoplastic elastomer; a first core layer capable of being stretched during orientation of the multi-layer film; a second core layer serving as an oxygen barrier and being compatible to the biaxial orienting and heat shrinking of the film; and a second outer layer comprising an ethylene/vinyl acetate copolymer; the multi-layer film being biaxially oriented.

Of interest is the disclosure of U.S. Pat. No. 3,891,008 for "Multilayer Thermoplastic Film and Method for Making Same" issued June 24, 1975 to D'Entremont, being directed to a polymeric composition comprising a blend of polybutene-1 with an ethylene-propylene copolymer which, when combined with a shrinkable, cross-linked polymer of ethylene produces a laminate having improved abuse and tear resistance and reduced self-adherence.

Of interest is the disclosure of U.S. Pat. No. 3,754,063 for "Method for Casting an Inflated Tubular Polyethylene Film with Mixed Polymer of Polypropylene-Polybutene-1" issued Aug. 21, 1973 to Schirmer, being directed to a thermoplastic film having improved abuse characteristics including a layer of ethylene vinyl acetate copolymer on a tubular substrate of a predominantly ethylene polymer material with an outer layer of admixed isotactic polypropylene, polybutene-1, and atactic polypropylene, the resulting film being oriented.

Of interest is the disclosure of U.S. Pat. No. 4,448,792 for "Pasteurizable and Cook-in Shrink Bag Constructed of a Multilayer Film" issued May 15, 1984 to Schirmer and assigned to a common assignee with the present application. This disclosure is directed to a multilayer film including a layer of propylene homopolymer or copolymer, a layer of a blend of the propylene polymer with butylene homopolymer or copolymer, an adhesive layer comprising a copolymer of ethylene, a fourth layer of vinylidene chloride copolymer, a fifth adhesive layer of ethylene copolymer, and another layer of propylene homopolymer or copolymer, the film being oriented and irradiated to at least a dosage sufficient to render the film delamination resistant during pasteurizing or cooking.

SUMMARY OF THE INVENTION

The instant invention is directed to a multi-layer film suitable for the packaging of food products.

In accordance with the present invention, there is provided a heat shrinkable thermoplastic film suitable for the packaging of food products which comprises a first, heat-sealable food contact layer comprising propylene homopolymer or copolymer; a second layer comprising a propylene homopolymer or copolymer, ethylene copolymer of fractional melt index, butylene homopolymer, or blends thereof; a third or adhesive layer comprising a copolymer of ethylene; a fourth or barrier layer comprising an unplasticized vinylidene chloride copolymer, a fifth or adhesive layer as in said third layer; and a sixth or optical clarity layer as in said first or second layer.

The method of the invention provides for a process for making a heat shrinkable film comprising melt forming a tubular film of the above described structure; carrying said film through a hot air oven; and orienting the film.

BRIEF DESCRIPTION OF THE DRAWINGS

Further details are given below with reference to the drawings wherein.

DESCRIPTION OF THE PREFERRED EMBODIMENTS

Figure 1:
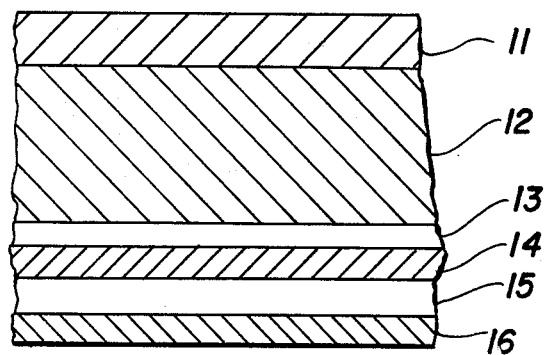
FIG. 1 is a schematic cross-section of a preferred embodiment of a multi-layer film of the invention.

Referring specifically to the drawings, in FIG. 1, a schematic cross-section of a preferred embodiment of the multiply film of the invention is shown the film structure is directed to a multi-layer composite having a general structure, beginning with the inside layer, A/B/C/D/C/A where A is a sealing and food contact layer, B is a shrink layer, C is an adhesive layer, and D is a barrier layer.

Specifically, inside layer 11 serves as a heat sealing layer and as a food contact layer and is propylene homopolymer or copolymer, and more specifically is a propylene-ethylene copolymer, the ethylene content being minor in extent and sufficient to promote orientability. A representative commercially available resin suitable for inside layer 11 is W 827 polypropylene copolymer available from Cosden (formerly Arco) Chemical Company. This resin has a density of 0.890 grams per cubic centimeter and a melt flow index of 4.0. Other suitable resins include ARCO J258 available from Cosden (formerly ARCO) Chemical Company, a propylene copolymer containing about 4.25% ethylene; and Eltex-P KS400 from Solvay, a polypropylene resin with about 3.8% ethylene by weight.

Shrink layer 12 can be composed of a propylene homopolymer or copolymer, and preferably the same propylene homopolymer or copolymer as in inside layer 11, or it may contain an ethylene copolymer to assist in orientation such as an EVA of 10–12% vinyl acetate content and of fractional melt index. "Fractional melt index" is used herein to define a material with a melt index of less than 1.0. "Melt Index" is used herein to indicate the amount, in grams, of a thermoplastic resin which can be forced through a given orifice under a specified temperature and pressure with ten minutes. The value should be determined in accordance with ASTM D 1238.

Adhesive layer 13 is compatible with adjacent layers to provide delamination resistance and representatively is ethylene methacrylate (EMA) or vinyl acetate (EVA) copolymer, such as commercially available Gulf resin 2205 being ethylene methacrylate copolymer with 20% methacrylate and balance ethylene and having a density of 0.942 and a melt index of about 2.4, or DuPont Alathon 3170.

An important feature of the present invention is barrier layer 14 which serves to inhibit transmission of oxygen and water vapor and is compatible with said adhesive layer to provide delamination resistance, and more specifically is vinylidene chloride copolymer. Even more specifically, the barrier layer 14 is a low viscosity low molecular weight unplasticized saran. Conventionally, the addition of plasticizers to vinylidene chloride copolymers is necessary to allow for coextrusion of saran with other resins in a typical coextrusion process. It has been found that the use of a low viscosity unplasticized saran in accordance with the present invention permits coextrusion of the saran in combination with the other materials of the present film without the need for plasticizers, and also results in improved barrier characteristics in the multiply film. The improved barrier characteristics include those applying to water vapor transmission as well as to oxygen transmission through the film. Suitable unplasticized sarans include either PV 858 or PV 864 manufactured by Solvay. These are similar resins, with PV 864 having a larger particle size than PV 858. These resins are representative of low viscosity vinylidene chloride copolymers. The relative viscosity of these representative examples is about 1.32. This value is derived by calculating the ratio between the dynamic viscosity of 1% of the unplasticized saran in a tetrahydrofuran solution, and the dynamic viscosity of pure tetrahydrofuran. Melt viscosity of these examples is about 750 pascals (PA.S.) at 100 reciprocal seconds and 170° C. (measured by cone and plate rheometer). More generally, unplasticized sarans with viscosities of less than 10,000 poise and preferably between 1,000 and 5,000 poise at 100 reciprocal seconds at 170° C. are preferred. A small percentage of suitable solid saran stabilizers and suitable extrusion aid may be added to the saran.

Suitable unplasticized sarans to be used in conjunction with the present invention may also be characterized by molecular weight, and specifically number average molecular weights ranging from 25,000 to 34,000, weight average molecular weights ranging from 53,000 to 68,000, and Z-average molecular weights ranging from 78,000 to 134,000 (tested by gel permeation chromotography compared with known sample such as poly-styrene).

Adhesive layer 15 is as in said layer 13. Optical clarity layer 16 is as in said layer 11 and additionally provides a pleasingly clear appearance of the film.

As further discussed below the film is oriented. Representatively, the multiply film will have a thickness of about 1 mil, layer 11 will have a thickness of about 0.2 mils, layer 12 about 0.2 mils, layer 13 about 0.1 mils, layer 14 about 0.2 mils, layer 15 about 0.1 mils, and layer 16 about 0.2 mils.

The term "oriented" and/or "orientation" are used herein to described the process and resulting product characteristics obtained by stretching a resinous orientable polymer thermoplastic material which is heated to its orientation temperature range and then cooled in order to lock-in or freeze the molecular alignment of the material in the direction of stretching. This action improves the mechanical properties of the film, such as, for example, shrink tension and orientation release stress. These properties may be measured in accordance with ASTM D 2838. Alternatively, the extent of orientation may be characterized by the extent of unrestrained shrinkage in accordance with ASTM D 2732. The orientation temperature range for a given film will vary with the different resinous thermoplastic materials or blends thereof which comprise the film. However, the orientation temperature range may generally be stated to be above room temperature and below the melting point of the thermoplastic material or blend of materials. Orientation temperature ranges for the materials encompassed by the present application are preferably between about 190° F. and 210° F., and a particularly suitable temperature range for the multiply film of the present invention is about 210° F. When the stretching force is applied in one direction uniaxial orientation results; when the stretching force is applied in two directions, biaxial orientation results. In a film made in accordance with the present invention, the degree of stretching to achieve desirable biaxial orientation is preferably about three times the original dimension in the machine direction and about four times the original dimension in the transverse direction.

Figure 2:
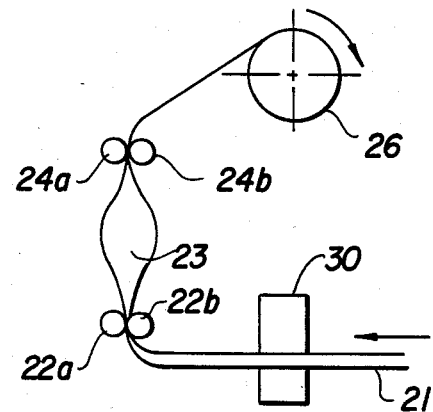
FIG. 2 is a schematic illustration of a preferred mode of making the film of the invention.

In FIG. 2, a preferred method of making the film of the invention is schematically illustrated. A preferred film such as film 10 above is melt-formed conventionally as by coextrusion (not shown) and the advancing tubular film at 21 is directed through a hot air oven 30 and onto nip rollers 22a,b and is biaxially between nip roll sets 24a,b and 22a,b while subjected to internal pressurization at 23. The oriented film is advanced from nip rollers 24 and directed to take up roll 26 and is then ready for use in the packaging of food products.

It is emphasized that the film of the present invention is preferably not irradiated and does not require an irradiation step, such as that shown for example in U.S. Pat. No. 4,448,792 issued to the common assignee of the present invention.

Referring to U.S. Pat. No. 4,448,792, that reference discloses an irradiated multi-layer film including a second or heat shrinkable layer of a blend of propylene polymer with butylene homopolymer or copolymer.

An unirradiated specimen of about 2 mils film thickness showed a water vapor transmission at 100° F. of 0.43 (grams/24 hours, 100 square inches) (Table 1 of the reference). An unirradiated specimen of 2 mils film thickness also showed an oxygen transmission at 73° F., 0% RH of 27 (CC/24 hours, square meter, atmosphere) (Table 1 of the reference). The saran layer of the reference has a thickness of about 0.2 mils.

In contrast, and by way of example, improved oxygen and moisture vapor barrier characteristics are obtained through the practice of the present invention. A one mil blown film containing an unplasticized saran, PV 864 vinylidene chloride copolymer manufactured by Solvay, the saran layer having a thickness of about 0.25 mils, displayed a moisture vapor transmission of about 0.35 grams/100 square inches 24 hours 100° F. at 100% relative humidity. This blown film included a heat-sealable layer of ethylene vinyl acetate copolymer, a second layer of linear low density polyethylene, a third or adhesive layer of ethylene vinyl acetate, a barrier layer of unplasticized vinylidene chloride copolymer, a fifth adhesive layer as in the third layer, and a sixth layer of ethylene vinyl acetate. This film specimen also displayed a rate of oxygen transmission of about 10 CC/square meter 24 hours at 73° F. and 0% relative humidity, and about 5 CC/square meter 24 hours 73° F. at 100% relative humidity.

Testing of moisture vapor transmission was done according to ASTM F 372. Testing of oxygen transmission was done according to ASTM D 3985.

TABLE 1

| Properties | Samples | | | |
| --- | --- | --- | --- | --- |
| | Sample 1 | Sample 2 | Sample 3 | Reference |
| Water Vapor Transmission[1] @ 100° F. | .34 | .33 | .39 | .43 |
| Oxygen Transmission[2] @ 73° F., 0% RH | 11.5 | 8.5 | 10.5 | 27 |

Notes:
[1]Units of grams/(24 hours, 100 square inches); approximate at 2 mils film thickness; ASTM F 372.
[2]Units of cubic centimeters STP (24 hours, square meter, atmosphere); approximate at 2 mils film thickness; ASTM D 3985.

In another example, four films were prepared in accordance with the present invention, each film including a first heat sealable layer of propylene ethylene copolymer; a second layer of a blend of 50% ethylene propylene copolymer and 50% polybutylene; a third or adhesive layer of ethylene methacrylate copolymer; a barrier layer of unplasticized vinylidene chloride copolymer; a fifth adhesive layer of ethylene vinyl acetate with 17% vinyl acetate content; and a sixth layer as in said first layer. The first of these four films contained a barrier layer of PV 867 unplasticized saran manufactured by Solvay; the second film, labeled Sample 5, contained a barrier layer of PV 864 unplasticized saran; Sample 6 contained a barrier layer with a mixture of 50% PV 864 and 50% PV 867 and Sample 7 contained a barrier layer of PV 867 of greater thickness than that in the samples discussed above.

Generally, each of these film samples had a total thickness of about 2 mils.

Physical properties for Samples 1 through 4 appear below in Table 2.

TABLE 2

|  | Sample 4 | Sample 5 | Sample 6 | Sample 7 |
|---|---|---|---|---|
| Tensile at Break and 73° F. (PSI)[1] | | | | |
| Av. Long. | 81.7 × 100 | 76.3 × 100 | 72.0 × 100 | 74.3 × 100 |
| Std. Dev. | 4.2 × 100 | 3.7 × 100 | 2.1 × 100 | 2.0 × 100 |
| 95% C.L.[2] | 6.8 × 100 | 5.9 × 100 | 3.3 × 100 | 3.3 × 100 |
| Av. Trans. | 72.9 × 100 | 65.1 × 100 | 62.3 × 100 | 60.2 × 100 |
| Std. Dev. | 4.4 × 100 | 4.0 × 100 | 3.5 × 100 | 4.4 × 100 |
| 95% C.L. | 6.9 × 100 | 6.3 × 100 | 5.6 × 100 | 7.1 × 100 |
| Elongation at Break and 73° F. (PSI)[3] | | | | |
| Av. Long. | 162 | 124 | 123 | 127 |
| Std. Dev. | 9 | 5 | 3 | 6 |
| 95% C.L. | 15 | 8 | 5 | 9 |
| Av. Trans. | 179 | 175 | 160 | 178 |
| Std. Dev. | 12 | 16 | 18 | 18 |
| 95% C.L. | 18 | 25 | 29 | 28 |
| Modulus at 73° F. (PSI)[4] | | | | |
| Av. Long | 94.1 × 1000 | 81.5 × 1000 | 78.2 × 1000 | 93.7 × 1000 |
| Std. Dev. | 4.3 × 1000 | 1.3 × 1000 | 4.7 × 1000 | 4.7 × 1000 |
| 95% C.L. | 6.8 × 1000 | 2.0 × 1000 | 7.5 × 1000 | 7.6 × 1000 |
| Av. Trans. | 96.8 × 1000 | 79.2 × 1000 | 69.3 × 1000 | 96.2 × 1000 |
| Std. Dev. | 5.7 × 1000 | 2.9 × 1000 | 3.3 × 1000 | 3.3 × 1000 |
| 95% C.L. | 9.1 × 1000 | 4.6 × 1000 | 5.2 × 1000 | 5.3 × 1000 |
| Ball Burst Impact at 73° F. 1.00 In. Diam. Sphere Hd. (cm. × kg.)[5] | | | | |
| Average | 16.8 | 8.8 | 10.4 | 5.3 |
| Std. Dev. | 3.2 | 2.1 | 2.1 | 0.5 |
| 95% C.L. | 5.1 | 3.3 | 3.3 | 0.8 |
| Water Vapor Transmission at 100° F.[6] | | | | |
| Sample 1 | 0.18 | 0.20 | 0.25 | 0.19 |
| Sample 2 | 0.23 | 0.21 | 0.24 | 0.18 |
| Sample 3 | 0.20 | 0.24 | 0.29 | 0.16 |
| Oxygen Transmission at 73° F., 0% RH[7] | | | | |
| Sample 1 | 4.6 | 5.7 | 4.9 | 2.8 |
| Sample 2 | 3.2 | 5.4 | 4.5 | 3.3 |
| Sample 3 | 4.6 | 5.9 | 6.6 | 3.1 |
| Oxygen Transmission at 73° F., 100% RH[8] | | | | |
| *Day 1* | | | | |
| Sample 1 | 4.4 | 5.9 | 3.7 | 2.1 |
| Sample 2 | 3.0 | 5.5 | 3.6 | 2.8 |
| Sample 3 | 4.4 | 6.0 | 5.0 | 2.6 |
| *Day 2* | | | | |
| Sample 1 | 4.5 | 6.0 | 3.6 | 2.0 |
| Sample 2 | 3.1 | 5.6 | 4.0 | 2.9 |
| Sample 3 | 4.5 | 6.0 | 5.2 | 2.2 |
| *Day 4* | | | | |
| Sample 1 | 4.2 | 5.6 | 3.5 | 2.0 |
| Sample 2 | 2.7 | 5.1 | 4.0 | 2.9 |
| Sample 3 | 4.1 | 5.6 | 5.2 | 2.2 |
| *Day 15* | | | | |
| Sample 1 | 1.3 | 2.5 | 3.5 | 2.0 |
| Sample 2 | 1.6 | 1.8 | 3.9 | 2.9 |
| Sample 3 | 2.1 | 1.3 | 5.2 | 2.2 |
| Saran Gauge[9] | | | | |
| *(Water Vapor Transmission Samples)* | | | | |
| Sample 1 Avg. | 0.64 | 0.42 | 0.30 | 0.46 |
| Std. Dev. | 0.04 | 0.04 | 0.01 | 0.02 |
| 95% C.L. | 0.05 | 0.05 | 0.01 | 0.03 |
| Sample 2 Avg. | 0.38 | 0.48 | 0.35 | 0.44 |
| Std. Dev. | 0.03 | 0.03 | 0.04 | 0.02 |
| 95% C.L. | 0.04 | 0.04 | 0.05 | 0.03 |
| Sample 3 Avg. | 0.44 | 0.33 | 0.27 | 0.60 |
| Std. Dev. | 0.02 | 0.05 | 0.01 | 0.01 |
| 95% C.L. | 0.03 | 0.06 | 0.02 | 0.01 |
| *(Oxygen Transmission Samples)* | | | | |
| Sample 1 Avg. | 0.40 | 0.40 | 0.41 | 0.69 |
| Std. Dev. | 0.01 | 0.01 | 0.02 | 0.02 |
| 95% C.L. | 0.02 | 0.01 | 0.03 | 0.03 |
| Sample 2 Avg. | 0.60 | 0.39 | 0.46 | 0.55 |
| Std. Dev. | 0.02 | 0.03 | 0.02 | 0.03 |

TABLE 2-continued

|  |  | Sample 4 | Sample 5 | Sample 6 | Sample 7 |
|---|---|---|---|---|---|
|  | 95% C.L. | 0.03 | 0.03 | 0.02 | 0.04 |
| Sample 3 | Avg. | 0.39 | 0.41 | 0.27 | 0.54 |
|  | Std. Dev. | 0.02 | 0.02 | 0.01 | 0.02 |
|  | 95% C.L. | 0.02 | 0.03 | 0.01 | 0.03 |

Notes:
[1] ASTM D882-81.
[2] C.L. is confidence limit - For example, if the reported average value was 10 and the 95% C.L. was 2, then of 100 replicate readings, 95 would have a value between 8 and 12 inclusive.
[3] ASTM D-882-81.
[4] ASTM D-882-81.
[5] ASTM D-3420-80.
[6] Units of grams/(24 hours, 100 square inches); approximate at 2 mils film thickness; ASTM F372.
[7] Units of cubic centimeters STP/(24 hours, square meter, atmosphere); approximate at 2 mils film thickness: ASTM D 3985.
[8] Testing methodology is outlined in ASTM Journal of Testing and Evaluation, Volume 12, Number 3, May 1984, pp. 149-151. Equipment is Ox-Tran Oxygen Permeability Test Equipment. "Sandwich Method" of ASTM article used in conjunction with manufacturer's (Modern Controls, Inc.) suggested procedures.
[9] 100 gauge is equal to 1 mil. Saran gauge figures were optically measured, and correspond to data samples re: oxygen and moisture transmission rates found in Table 2.

A significant aspect of the present invention is the use of a low viscosity unplasticized saran as a barrier layer in the present film. The saran which is used is without the plasticizers such as those commonly used in the art in connection with the coextrusion of films including a saran layer. The present invention allows for the use of an unplasticized saran with a melt index and viscosity sufficiently low to still permit coextrusion of the saran along with the other layers of the present film. It has been found that the use of a low viscosity unplasticized saran in combination with the present multiply film provides a heat shrinkable film suitable for food packaging wherein improved water vapor and oxygen transmission barrier characteristics are obtained. As an example, reference is made to Table 1 and specifically to the water vapor and oxygen transmission data for the present invention as compared with the analogous data for the multi-layer film disclosed in U.S. Pat. No. 4,448,792.

In use, the film of the invention is very suitable in conventional heat-shrinking operations to package food products such as snack foods, bakery goods, cheese products and candy.

Although the present invention has been described in conjunction with preferred embodiments it is to be understood that modifications and variations may be utilized without departing from the principles and scope of the invention, as those skilled in the art will readily understand. Accordingly such modifications and variations may be practiced within the scope of the following claims.

What is claimed is:

1. A heat-shrinkable thermoplastic film suitable for the packaging of food products comprising:
   (a) a first, heat-sealable food contact layer comprising propylene homopolymer or copolymer;
   (b) a second layer taken from the group consisting of propylene homopolymer, propylene copolymer, ethylene copolymer, butylene homopolymer, or blends thereof;
   (c) a third or adhesive layer comprising a copolymer of ethylene;
   (d) a fourth or barrier layer comprising a low viscosity unplasticized vinylidene chloride copolymer;
   (e) a fifth or adhesive layer; and
   (f) a sixth or optical clarity layer as in said first or second layer.

2. The film of claim 1 wherein said first layer comprises a propylene-ethylene copolymer, the ethylene content being minor in extent and sufficient to promote orientability.

3. The film of claim 1 wherein said second layer comprises a propylene homopolymer or copolymer as in said first layer.

4. The film of claim 1 wherein said second layer comprises ethylene copolymer.

5. The film of claim 4 wherein an ethylene copolymer has a vinyl acetate content of between about 10 and 12% and a fractional melt index.

6. The film of claim 1 wherein said third layer comprises ethylene methacrylate copolymer.

7. The film of claim 1 wherein said third layer comprises ethylene vinyl acetate copolymer.

* * * * *

UNITED STATES PATENT AND TRADEMARK OFFICE
CERTIFICATE OF CORRECTION

PATENT NO. : 4,608,302
DATED : August 26, 1986
INVENTOR(S) : Henry G. Schirmer

It is certified that error appears in the above-identified patent and that said Letters Patent is hereby corrected as shown below:

On the face of the Patent, insert:

--The portion of the term of this patent subsequent to May 15, 2001 has been disclaimed.--

Signed and Sealed this

Twenty-ninth Day of March, 1988

Attest:

DONALD J. QUIGG

*Attesting Officer*    *Commissioner of Patents and Trademarks*